Patented Apr. 19, 1949

2,467,460

UNITED STATES PATENT OFFICE 2,467,460

METHOD FOR THE PRODUCTION OF ESTERS OF DIOLES AND TRIOLES OF CYCLOPENTANE-POLYHYDRO-PHENANTHRENE SERIES

Ingolf Bennekou, Frederiksberg, Denmark, assignor to Lovens kemiske Fabrik v/Aug. Kongsted, Copenhagen, Denmark No Drawing. Application May 16, 1946, Serial No. 670,298. In Denmark January 29, 1942

Section 1, Public Law 690, August 8, 1946
Patent expires January 29, 1962

4 Claims. (Cl. 260—397.5)

It is known to produce esters of hydroxyl-containing compounds of the cyclopentane-polyhydro-phenanthrene series, such as oestradiole, by reacting the said compounds with the anhydrides or halogenides of the said acids, preferably in a basic medium (sodiumhydroxide, pyridine). Such esters have a protracted effect in relation to the corresponding non-esterified compounds.

As far as the production of esters of acids with more than two carbon atoms in the molecule is concerned, however, the said method gives difficulties there being then a tendency to side reactions, especially when the initial materials are not quite pure.

It has now proved that, when it is a case of producing esters of dioles and trioles of the cyclopentane-polyhydro-phenanthrene series with acids with three carbon atoms and more in the molecule, one may, instead of treating the free hydroxyl compounds proper with acylating agents, by treating the halogen-magnesium compounds produced by reaction of the hydroxyl compounds with Grignard compounds with acylating agents produce the said esters in an especially gentle way, whereby the products may be obtained direct in a very pure state.

By esterification in the usual way one never gets the compound desired in its pure state by isolation after the reaction between the hydroxyl compound and the acid chloride or the acid anhydride, but the compound is mixed with larger or smaller quantities of non-identified, oily, or resiny substances, which must have been formed by side reactions or destruction, probably caused by the rather strongly basic reaction medium and the rather high reaction temperature.

In accordance with the present invention esters of dicles and trioles of the cyclopentane-polyhydro-phenanthrene series are, therefore, produced by the said dioles and trioles being first reacted with Grignard compounds, after which the halogen-magnesium compounds produced are treated with anhydrides or halogenides of acids with 3 carbon atoms and more in the molecule.

The use of a basic reaction agent is not demanded in this method, but the reaction may be carried out in any inert solvent such as ether.

As dioles and trioles desirably esterified by the present method may for example be mentioned estradiole, estratriole, androstandiole, and androstendiole.

By the reaction may be produced partial as well as complete esters.

The reactions taking place for example in the production of an ester of oestradiole with the application of acid halogenide may be illustrated by the following scheme, where R.Mg.Hl is the Grignard compound used, R is alkyl, Hl is halogen, and Ac means acyl:

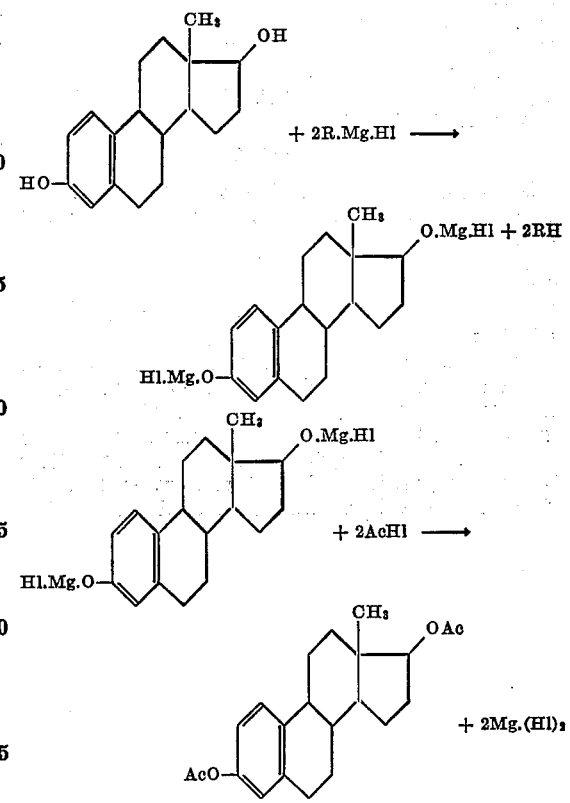

By the use of acid anhydride the reaction scheme for the last part of the process is:

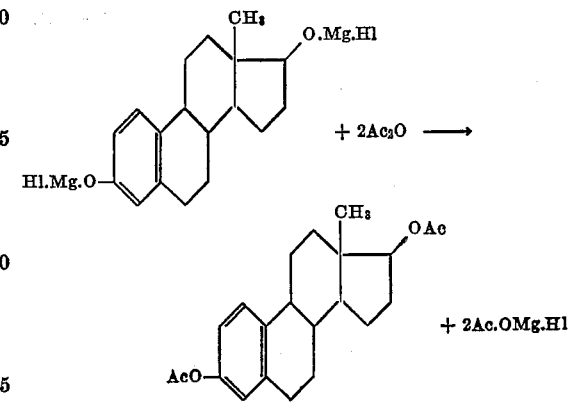

Example 1

To a solution of magnesium-ethyl-bromide in ether, produced of 7.3 g. of magnesium chips, 45 g. of ethyl bromide, and 300 ml. of ether, is in the course of an hour added a solution of 20 g. of oestradiole in 2½ l. of dry ether. The mixture is boiled for 20 minutes and then left for 3½ hours. At that time a solution is slowly added of 36 g. of newly-distilled propionic acid anhydride in 500 ml. of dry ether.

The mixture is next boiled for 1 hour and left for about 24 hours. After another quarter of an hour's boiling the reaction mixture is cooled, which mixture amongst other things contains oestradiole-propionate, dissolved in ether, and the compound $C_2H_5COO.Mg.Br$, and poured on crushed ice, after which concentrated hydrochloric acid is added for the decomposition of the latter compound. The ether layer is separated off, and the aqueous phase once more shaken with ether.

The combined ether extracts are washed with water and extracted several times with 1 n NaOH and then finally washed with water. After drying over water-free sodium sulphate the ether is evaporated off. The white crystalline remainder, which consists of oestradiole-propionate, is recrystallized by ethyl alcohol. Output 23 g. Melting point 104–106° C.

Example 2

For a partial esterification is used the quantity of Grignard compound equivalent to one hydroxyl group.

To a solution of 1.0 g. of oestradiole in water-free ether is slowly under boiling with return-flow cooler dropped a solution of magnesium-ethyl-bromide in ether produced in the usual way of 0.09 g. of magnesium. Next 1.0 g. of propionic acid anhydride dissolved in dry ether is slowly dropped in. After an hour's boiling it is left for 24 hours and next poured on ice and decomposed with hydrochloric acid. The ether layer is separated off, and the water layer is shaken with ether. The combined ether solutions are shaken with 1 n NaOH in order to remove compounds containing an un-reacted phenol group. The ether is dried over sodium sulphate and evaporated off, whereby is obtained 0.75 g. of a crystalline substance, which by analysis appears to consist of 10 per cent. of the dipropionate and 90 per cent. of the 3-monopropionate. By recrystallization the pure monopropionate may be obtained.

I claim:

1. Method of producing esters of polyhydroxy cyclopentano phenanthrene compounds comprising reacting the polyhydroxy cyclopentano phenanthrene compound with a Grignard reagent in an inert solvent to form a Grignard derivative thereof and reacting the Grignard derivative with an acid derivative selected from the group consisting of organic carboxy acid anhydrides and organic carboxy acid halides.

2. Method of producing esters of estradiol comprising reacting estradiole with a Grignard reagent in an inert solvent to form the Grignard derivative thereof, and reacting the Grignard derivative with an acid derivative selected from the group consisting of organic carboxy acid anhydrides and organic carboxy acid halides.

3. Method of producing esters of androstanediol comprising reacting androstanediol with a Grignard reagent in an inert solvent to form the Grignard derivative thereof, and reacting the Grignard derivative with an acid derivative selected from the group consisting of organic carboxy acid anhydrides and organic carboxy acid halides.

4. Method of producing esters of androstenediol comprising reacting androstene diol with a Grignard reagent in an inert solvent to form the Grignard derivative thereof, and reacting the Grignard derivative with an acid derivative selected from the group consisting of organic carboxy acid anhydrides and organic carboxy acid halides.

INGOLF BENNEKOU.

No references cited.